United States Patent
Lang

Patent Number: 5,956,377
Date of Patent: Sep. 21, 1999

[54] METHOD AND APPARATUS FOR SYNCHRONIZING FRAMES WITHIN A CONTINUOUS STREAM OF DIGITAL DATA

[75] Inventor: Ralph Uwe Lang, Richmond, Canada

[73] Assignee: VTech Communications, Ltd., Hong Kong, The Hong Kong Special Administrative Region of the People's Republic of China

[21] Appl. No.: 08/655,902

[22] Filed: May 31, 1996

[51] Int. Cl.$^6$ .................................................. H04L 7/00
[52] U.S. Cl. ........................... 375/372; 375/368; 370/514
[58] Field of Search ................................ 375/365, 366, 375/368, 372; 370/510, 511, 514

[56] References Cited

U.S. PATENT DOCUMENTS

| | | | |
|---|---|---|---|
| 3,838,395 | 9/1974 | Suttill, Jr. et al. | 340/149 A |
| 4,353,065 | 10/1982 | Mori | 340/825.44 |
| 4,479,125 | 10/1984 | Mori | 340/825.44 |
| 4,529,980 | 7/1985 | Liontine et al. | 340/825.52 |
| 4,663,623 | 5/1987 | Lax et al. | 340/825.44 |
| 4,663,765 | 5/1987 | Sutphin et al. | 340/5 |
| 4,740,962 | 4/1988 | Kish, III | 375/368 |
| 4,745,408 | 5/1988 | Nagata et al. | 340/825.44 |
| 4,763,339 | 8/1988 | Sutphin et al. | 375/365 |
| 4,783,654 | 11/1988 | Ichikawa | 340/825.44 |
| 5,285,443 | 2/1994 | Patsiokas et al. | 370/29 |
| 5,297,203 | 3/1994 | Rose et al. | 380/9 |
| 5,400,369 | 3/1995 | Ikemura | 375/368 |
| 5,661,764 | 8/1997 | Nakajima | 375/368 |

OTHER PUBLICATIONS

Common air interface specification (CTX–2) by European Telecommunications Standards Institute, Nov. 1994, Second Edition (I–ETS 300 131).

Primary Examiner—Don N. Vo
Attorney, Agent, or Firm—Dick and Harris

[57] ABSTRACT

An apparatus is disclosed for synchronizing frames in a continuous stream of digital data consisting of a plurality of master frames (M-bits long) containing data and a constant synchronization word and having an associated bit clock. The apparatus includes a FIFO buffer, a synchronization word register (containing the constant synchronization word) and a comparator operably connected to the FIFO buffer and the synchronization word register to generate a sync detect signal representing whether the portion of the continuous stream of data contained in the FIFO matches the constant synchronization word. The apparatus further includes a frame bit counter controlled by the sync detect signal and the associated bit clock, which generates a frame sync signal every M-bits, a counter connected to a first comparator that generates a sync achieved signal upon the counter output value equaling a first predetermined value and means for incrementing the counter upon coincidence of the sync detect and frame sync signals. The disclosure also discloses a method for synchronizing frames in a continuous stream of digital data while minimizing delay in processing the audio data in a radio communication system including the step of locating a minimized synchronization word in multiple contiguous frames as a predicate to locking synchronization.

2 Claims, 2 Drawing Sheets

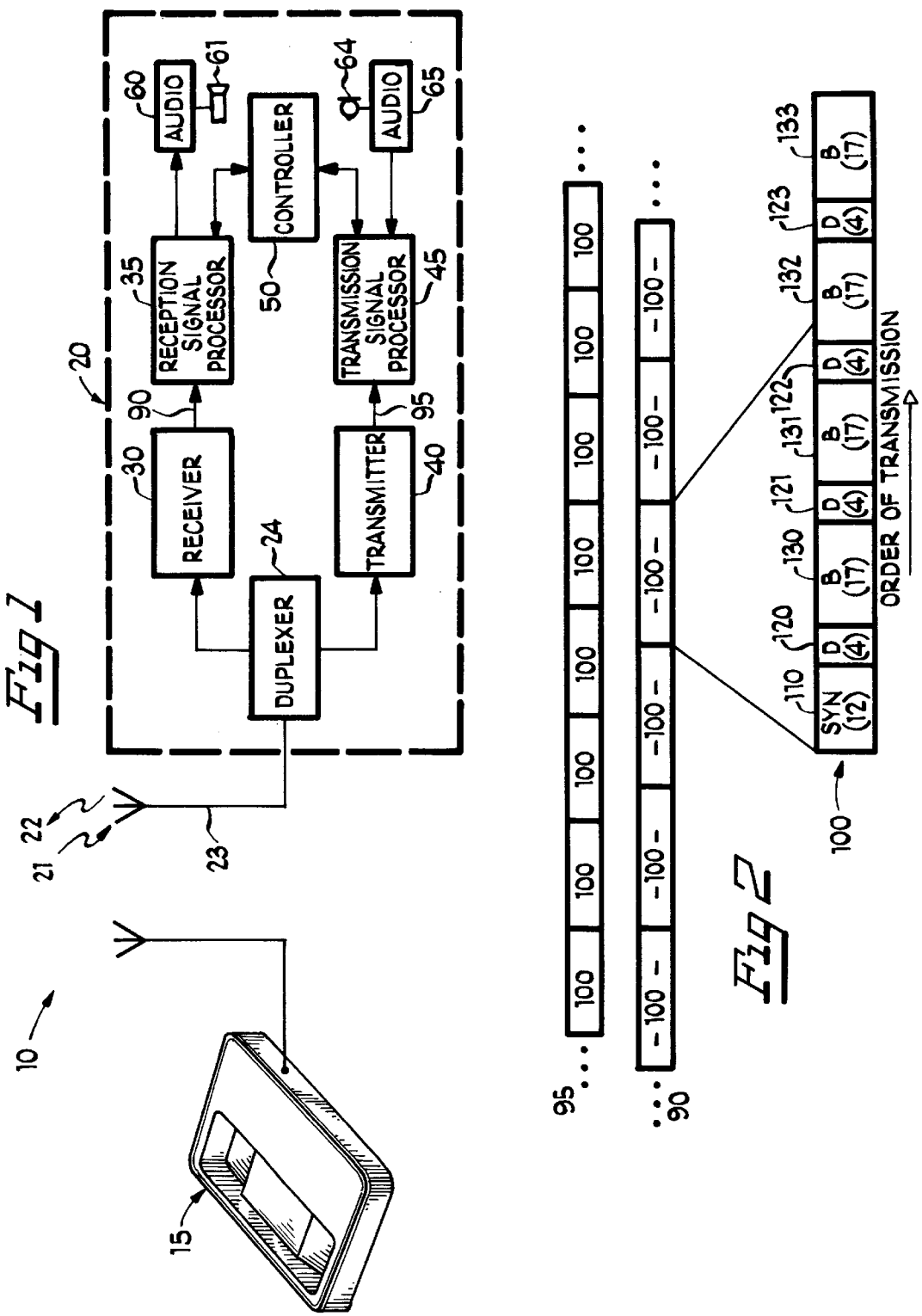

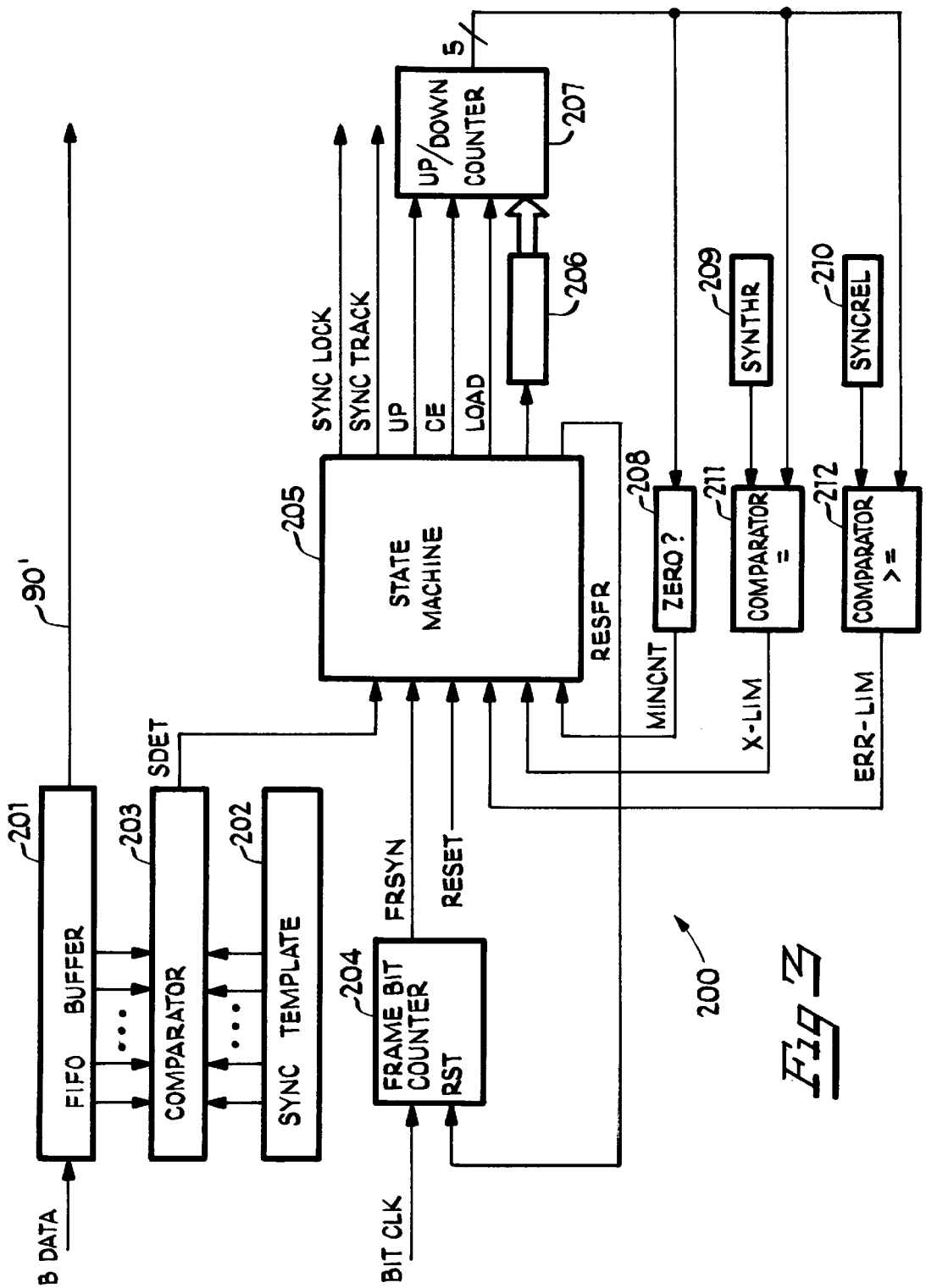

METHOD AND APPARATUS FOR SYNCHRONIZING FRAMES WITHIN A CONTINUOUS STREAM OF DIGITAL DATA

BACKGROUND OF THE INVENTION

1. Field of the Invention

The present invention relates in general to digital radio communication and, in particular, to a method and apparatus for synchronizing discrete frames of data transmitted as a continuous stream of digital data in a receiver.

2. Background Art

The transmission of digital voice data over a radio frequency communication link is very often implemented by transferring the stream of digital data as discrete packets or frames (as opposed to a continuous homogeneous stream) of information from a transmitter to a receiver. Proper recovery of this digital information depends in part upon the receiver being in sync with the stream of incoming digital data packets. In general, apparatuses for synchronizing frames within a stream of digital data have been known in the art. Most of these prior art apparatuses provide for synchronization occurring at a particular repeating interval during the reception of an incoming digital data stream.

In some digital communication systems, multiple types (configurations) of packets each having different characteristics, such as length and data type, are employed. In such a system, one packet type may be configured for voice, another for command, and yet another to acquire and maintain synchronization between the transmitter and receiver. A system incorporating multiple data packet types may often experience control problems which typically increases system complexity and contributes to other undesirable design and operating characteristics. Cordless telephones designed to the CT-2 specification are representative of this type of system.

In devices following the CT-2 specification, after initiation of the radio link, the ratio of transmitted audio data to command data is quite large resulting in limited ability to control and monitor the radio link during an on-going conversation. The CT-2 specification introduces further complexity by not utilizing a synchronization field during this on-going conversation, instead establishing synchronization only during the initiation of the radio link Accordingly, it is an object of the present invention to provide a single data frame type wherein each frame contains a synchronization field, an audio field and a command data field in every frame.

Some prior art digital communication systems do already use packets having segregated fields for voice, command and error correction data in each frame. This approach creates an inherent delay in audio data transmission and processing caused by the arrangement of the frames. First, in many such prior art systems the segregation of the various types of data (i.e. voice, command, sync) requires extensive buffering to bundle the packet for transmission and, later, unbundle the overall frame. Second, the addition of data extraneous to the actual voice data causes audio delay. Delay is undesirable in a digital audio path because it decreases the Mean Opinion Score (a commonly used assessment of the quality of the communication link as it relates to speech) for the overall transmission system.

In some of these systems a synchronization marker or field is included in the stream or as part of a packet at regular intervals. Further adding to the delay, this sync field is located within the incoming stream of data by the synchronizing apparatus in the receiver to achieve sync. The design of this synchronization field requires balancing of various opposing factors. The loner the synchronization field the more likely "location" of that field has truly located the sync word. However, the longer the synchronization field, the greater the delay introduced into the audio channel. Conversely, the shorter the sync field the less likely "location" of that field is truly the sync word rather than "lookalike" data, yet the shorter the introduced audio delay.

Accordingly, it is a further object to include a specifically formatted synchronization field in each data frame to simplify synchronization of the packets. However, since introduction of a synchronization word adds delay, it is an associated object of the present invention to provide a hybrid synchronization scheme that minimizes delay in the audio path.

This and other objects of the present invention will become obvious to those of ordinary skill in the art based upon the present specification, drawings and claims.

SUMMARY OF THE INVENTION

The present invention is directed to an apparatus for synchronizing frames in a continuous stream of digital data, which consists of a plurality of master frames. Each of these master frames have M-bits containing data, a constant synchronization word, and an associated bit cock The apparatus includes at least a FIFO buffer, synchronization word register, a comparator, a frame bit counter, a counter, a first comparator and means for incrementing the counter.

In particular, the continuous stream of data is shifted through the FIFO at a rate controlled by the associated bit dock, such that the FIFO buffer holds a portion of the continuous stream at one time. The comparator is operably connected to the FIFO buffer and the synchronization word register, which contains the constant synchronization word. In this arrangement, the comparator or generates a sync detect signal representing whether the portion of the continuous stream of data contained in the FIFO buffer matches the constant synchronization word. The frame bit counter, which is controlled by the associated bit clock, generates a frame sync signal every M-bits. The means for incrementing the counter does so upon coincidence of said sync detect and frame sync signals, such that the counter's output is incremented. This counter output is operably connected to the first comparator, which generates a sync achieved signal upon the counter output value equaling a first predetermined value. In this manner the apparatus can determine appropriate synchronization timing for the continuous stream of digital data, which is indicated by the frame sync signal once the sync achieved signal is generated.

In one embodiment of the present invention, the apparatus further includes means for decrementing the counter output value upon non-coincidence of the sync detect and frame sync signals. In this embodiment, the apparent also includes a second comparator, which generates a sync lost signal upon the counter output being equal to or greater than a second predetermined value.

In a preferred embodiment, the apparatus further includes means for indicating a synchronization state, which represents whether synchronization has been sufficiently achieved based upon the sync detect signal, the frame sync signal, the sync achieved signal and the sync lost signal. This means further controls the counter and frame bit counter based upon the synchronization state.

The present invention further comprises a method for synchronizing frames (each of which contains at east a constant synchronization word and digital audio data) in a continuous stream of digital data while minimizing delay in processing the audio data. This method has particular utility in a radio communication system having at least one receiver. The method comprising the steps of minimizing the size of the constant synchronization word; and providing facilities to each of the at least one receiver that locate multiple, contiguously occurring instances of the minimized synchronization word as a predicate to locking synchronization.

BRIEF DESCRIPTION OF THE DRAWINGS

FIG. 1 of the drawings is a block diagram of one radio communication system in which the presently disclosed method and apparatus for synchronizing frames within a continuous stream of digital data may be utilized;

FIG. 2 of the drawings is a block diagram of the received and transmitted data streams, and master frame utilized in a preferred embodiment of the present invention; and FIG. 3 of the drawings is a block diagram of sync channel receiver of the present invention.

DETAILED DESCRIPTION OF THE DRAWINGS

While the present invention is susceptible of embodiment in many different forms and may be utilized in many different types of radiotelephonic systems, there is shown in the drawings and will herein be described in detail, one specific embodiment with the understanding that the present disclosure can be considered as an exemplification of the principles of the invention and is not intended to limit the invention to the embodiment illustrated.

FIG. 1 of the drawings is a block diagram representation of one preferred digital radio communication system in which the present frame synchronizing method and apparatus can be practiced. In particular, FIG. 1 shows a cordless telephone system 10 having base unit 15 and handset unit 20. As base unit 15 and handset unit 20 in most cordless telephone systems have substantially identical data processing paths, only handset unit 20 will be described in detail with the understanding that much of the foregoing description applies equally to base unit 15.

Handset unit 20 receives and transmits digital signals 21 and 22, respectively, via antenna 23 and duplexer 24. Received digital signal 21 is recovered by receiver 30, as known in the art. Reception signal 35 operably accepts and processes received digital data stream 90 toward recovering voice and command data. As part of reception signal processor 35, sync channel receiver 200 (shown in FIG. 3) locks handset unit 20 onto the correct synchronization to facilitate voice and command data recovery. The voice data is operably transmitted to audio recovery circuitry 60 and, in turn, speaker 61 and the command data may be openly transmitted to controller 50. Transmission signal processor 45 combines voice data from audio encoder 65 and microphone 64 and command data from controller 50 to form transmitted digital data stream 95. Transmitted digital data stream 95 is then transmitted by transmitter 40 via duplexer 24 and antenna 23, as known in the art.

As shown in FIG. 2, received and transmitted data streams 90 and 95, respectively, comprise a plurality of master frames 100. In a preferred embodiment, each master frame 100 comprises a 12-bit synchronization (sync) field 110 followed immediately by four 4-bit D-channel subframes 120, 121, 122 and 123 that are preferably evenly interleaved between four 17-bit B-channel fields 130, 131, 132 and 133.

The specific lengths of each field in master frame 100 were selected due to particular design choices, and more particularly, a desired 32 Kbit/s audio rate and the parameters of cordless telephone system 10. The content, arrangement and size of D-channel data in each master frame 100 is also a matter of balancing various trade-oft. In most systems, the actual D-channel is much larger than the field size in the presently disclosed preferred embodiment. Thus, a single command would have to be spread across multiple master frames 100 to accommodate that protocol. Also in that preferred embodiment, the content, arrangement and size of each of the 17-bit B-channel fields 130, 131, 132 and 133 is a matter of choice. In particular, in a preferred embodiment each contains audio data and an error detection bit related to that audio data.

While a preferred form of master frame 100 has been described, it should be noted that the synchronization scheme of the present disclosure has utility in any digital communication system with any combination of fields, field sizes, digital-to-analog conversion techniques, voice compression algorithms, etc. as long as each master frame contains a synchronization field.

SYNC field 110 is a preselected fixed bit pattern found in each master frame 100 that provides framing reference to assist each receiver in recovering timing and frame alignment for the incoming stream of digital data. SYNC field 110 may be placed anywhere within each master frame 100, as long as it is placed in the same location in each such frame.

As a result of various trade-offs, a preferred embodiment of SYNC field 110 contains 12 bits. The shorter SYNC field 110, the harder it is to insure acquisition of the "real" synchronization signal in the incoming stream of digital data rather than a "look-alike" portion of digital voice or command data. Conversely, the longer SYNC field 110, the more undesirable delay introduced into the audio channel. Although the effective delay could be partly minimized by splitting SYNC field 110 into multiple sub-fields spread across master frame 100, this configuration would increase the complexity of acquiring synchronization and introduces the same misidentification concern altogether, present with the use of a shorter synchronization fields.

Sync channel receiver 200 (shown in FIG. 3) found in reception signal processor 35 is responsible for locating SYNC field 110 toward establishing with received digital stream 90. As discussed above, continuous sync fields are desirable, but the delay they create is not. The present invention resides, in part, in selecting the relatively short synchronization field (discussed above) and providing hardware/software for multiple acquisitions of that synchronization field at the same location in multiple, consecutive frames in received digital stream 90. So essentially, the shorter length is compensated for by requiring location of the shorter sync field in multiple packets. As a result, sync channel receiver 200 is designed around a 2-bit state machine having three possible states:

TABLE 1

States of Sync channel receiver 200

| STATE NAME | SYNC LOCK | SYNC TRACK |
|---|---|---|
| Acquire | 0 | 0 |
| Track | 0 | 1 |

TABLE 1-continued

States of Sync channel receiver 200

| STATE NAME | SYNC LOCK | SYNC TRACK |
|---|---|---|
| Lock | 1 | 1 |
| (not possible) | 1 | 0 |

A state transition table indicating operation of the sync channel receiver is shown below.

TABLE 2

States, Inputs and Outputs of state machine 205 of Syn channel receiver 200

| Line # | Current State | | Inputs | | | | | Next State | | Outputs | | | |
|---|---|---|---|---|---|---|---|---|---|---|---|---|---|
| | lock | track | sdet | frsyn | mincnt | x-lim | errlim | lock | track | load | up | ce | load-high |
| 1 | 0 | 0 | 0 | x | x | x | x | 0 | 0 | 1 | x | 0 | 1 |
| 2 | 0 | 0 | 1 | x | x | x | x | 0 | 1 | 0 | 1 | 1 | x |
| 3 | 0 | 1 | x | 0 | x | x | x | 0 | 1 | 0 | x | 0 | x |
| 4 | 0 | 1 | 0 | 1 | x | 0 | x | 0 | 0 | 1 | x | x | 1 |
| 5 | 0 | 1 | 1 | 1 | x | 0 | x | 0 | 1 | 0 | 1 | 1 | x |
| 6 | 0 | 1 | x | x | x | 1 | x | 1 | 1 | 1 | x | x | 0 |
| 7 | 1 | 1 | x | 0 | x | x | 0 | 1 | 1 | 0 | x | 0 | x |
| 8 | 1 | 1 | 0 | 1 | x | x | 0 | 1 | 1 | 0 | 1 | 1 | x |
| 9 | 1 | 1 | 1 | 1 | 0 | x | 0 | 1 | 1 | 0 | 0 | 1 | x |
| 10 | 1 | 1 | 1 | 1 | 1 | x | 0 | 1 | 1 | 0 | x | 0 | x |
| 11 | 1 | 1 | x | x | x | x | 1 | 0 | 0 | 1 | x | x | 1 |

These various states are described hereinbelow with reference to Table 2 (and reference to particular Line #) and FIG. 3 of the drawings.

Upon issuance of RESET, sync channel receiver 200 resets state machine 205 to acquire state (00), as shown in Table 2 at line 1. In the acquire state (00), sync channel receiver 200 scans received digital stream 90 for a first occurrence of SYNC field 110. Scanning is continually performed by FIFO buffer 201, SYNC template register 202 and comparator 203, in combination. SYNC template register 202 contains the preselected synchronization word. Where L is the length of the synchronization word and SYNC template 202, FIFO buffer 201 is a first-in, first-out buffer that is at least L-bits long to facilitate comparison of the received digital stream 90 by comparator 203 between the last L-bits from stream 90 and the L-bit long sync word contained in register 202. In a preferred embodiment, FIFO buffer 201 is implemented by a 1-bit wide, 12-bit long shift-register clocked by a bit rate clock recovered by the receiver from received digital stream 90, as known in the art. Of course, other buffering arrangements are within the scope of the present invention.

Line 1 (acquire state)—SDET: 0 and FRSYN: x

As state machine 205 is in acquire state and no SYNC field 110 has been detected (SDET=0), the value of FRSYN ("frame sync") "doesn't matter", and will be explained with reference to Line 3 below. In this state, state machine 205 loads up/down counter 207 with a constant "minus 2" (LOAD=1 (load constant), CE=0 (counter enable) and LOADHIGH=1) to prepare for later synchronization tracking and lock. As CE=0, the value of UP "doesn't matter." The selection of negative 2 for loading is a matter of design choice as will become apparent hereinbelow.

Line 2 (acquire state)—SDET: 1 and FRSYN:x

While in acquire state (00), upon detection of SYNC field 110 in any consecutive L-bits (the length of SYNC template 202) of received digital stream 90, SDET (sync detect) is generated by comparator 203. As no previous SYNC field 110 had been detected since this acquire (00) state began, the value of FRSYN still "doesn't matter." In response to SDET being HIGH, state machine 205 resets frame bit counter 204 (by asserting RESFR HIGH), incets up/down counter 207 (LOAD=0, CE=1 and UP=1) because a sync marker was found, and progresses to track state (01).

Resetting frame bit counter 204 establishes a temporary frame timing that periodically asserts FRSYN, (frame syndication signal) every M-bits (where M is the length of entire master frame 100). In the disclosed embodiment, M is 96-bits, however, this length can be modified as would be obvious to one of ordinary skill in the art. Once synchronization lock is achieved FRSYN becomes the permanent frame timing for the system.

Line 3 (track state)—SDET:x and FRSYN:0

In this state, sync channel receiver 200 is waiting for the current master frame to totally shiftout of FIFO buffer 201 while the next master frame shifts into position. Like FIFO buffer 201, frame bit counter 204 is docked by the bit clock recovered from received digital stream 90, such that, as frame bit counter 204 issues a FRSYN signal, SYNC field 110 should be in FIFO buffer 201 for comparison against SYNC template 202. If the correct SYNC field 110 is fully in the buffer, comparator 203 issues SDET HIGH. In other words, the value of SDET 213 (sync detected) "doesn't matter" unless the stream has advanced M-bits. Inasmuch as FRSYN is LOW, the received digital stream 90 has not advanced M-bits through FIFO buffer 201, the value of SDET "doesn't matter." During this time, up/down counter 207 remains at its current value (LOAD=0 and CE=0).

Lines 4 and 5 (track state)—SDET: 0 or 1: FRSYN: 1 and X-LIM: 0

At this point, sync channel receiver 200 has located at least one SYNC field 110 but has not located a sufficient number of fields to be deemed a syndication "lock", as indicated by X-LIM being LOW. X-LIM is generated by equality comparator 211, which compares the output of up/down counter 207 with constant value SYNTHR 209 (preselected number of correctly located SYNC field 110 required to achieve lock). The value selected for SYNTHR 209 results from balancing various trade offs which will be device and environmentally dependent. Further, the greater the selected value the more likely the receiver has synchronized to true SYNC field 110, and the more data that will be lost during sync acquisition.

At this point in the track state FRSYN is HIGH (indicating the stream has advanced M-bits), thus, the value of SDET "matters" because SYNC field 110 must be in the portion of received digital stream 90 in FIFO buffer 201 at this time if there is any synchronization. In Line 4, SDET is LOW, meaning the SYNC field 110 was not detected, thus indicating synchronization is off, in turn, state machine 205 returns to acquire (00) state and reloads up/down counter 207 with "minus 2" (LOAD=1, CE=0 and LOADHIGH=1).

In Line 5, SDET is HIGH indicating that, SYNC field 110 has been detected at its expected location in received digital stream 90. In response, state machine 205 increments up/down counter 207 by one (LOAD=0, CE=1, UP=1) and continues in track (01) state.

Line 6 (track state)—SDET: x FRSYN: x and X-LIM: 1

At this time, state machine 205 is still in its track state, yet as indicated by X-LIM being HIGH, sync channel receiver has now correctly located the preselected number (as stored in SYNTHR 209) of SYNC fields 110. In response, state machine 205 loads up/down counter 207 with zero (LOAD=1 and LOADHIGH 0) and advances to lock state.

Line 7 (lock state)—SDET: x FRSYN: 0 and ERR-LIM: 0

Although now in lock (11) state, much like Line 3, state machine 205 is waiting while sync channel receiver 200 merely shifts received digital stream 90 through FIFO buffer 201 looking for the next occurrence of SYNC field 110. As before, acquisition of SYNC field 110 must also be at the same location in each master frame 100, so the value of SDET (sync detected) "doesn't matte" unless the stream has advanced M-bits. In line 7, FRSYN is LOW indicating that received digital stream 90 has not advanced M-bits through FIFO buffer 201, so state machine 205 remains in lock (11) state and up/down counter 207 remains at its current value (LOAD=0 and CE=0).

Line 8 (lock state)—SDET: 0 FRSYN: 1 and ERR-LIM: 0

Although FRSYN is HIGH, indicating that FIFO buffer 201 should contain SYNC field 110, SDET is LOW indicating that no SYNC field 110 is detected, thus in this instance synchronization is not being correctly tracked by sync channel receiver 200. In the present invention, any one particular missed sync word will not necessarily result in a lost synchronization status. Instead, as explained more fully hereinbelow, state machine 205 in combination with other elements of sync channel receiver 200 "integrates" these missed sync markers over time. Accordingly, in response to the missed sync marker, state machine 205 increments up/down counter 207 (LOAD=0, CE=1, UP=1) and continues lock (11) state.

Lines 9 and 10 (lock state)—SDET: 1; FRSYN: 1; ERR-LIM: 0; MINCNT:0 or 1

SDET and FRSYN are both HIGH, indicating sync detection has correctly occurred. Nonetheless, in of integrating synchronization quality, state machine 205 decrements up/down counter 207 unless the counter is saturated. In particular, in Line 9, MINCNT is LOW so up/down counter 207 has not saturated, so state machine 205 decrements up/down counter 207 by one (LOAD=0, CE=1, UP=0). In Line 10, MINCNT is HIGH so up/down counter 207 has saturated, so state machine 205 does not alter the value of up/down counter 207 (LOAD=0, CE=0). In both Line 9 and 10, state machine 205 continues in lock (11) state.

Line 11 (lock state)—SDET: x FRSYN:x and ERR-LIM: 1

Sync channel receiver is in lock (I1) state, yet ERR-LIM is HIGH reflecting that the integration variable has exceeded its predetermined limit indicating that synchronization has been lost.

As state machine 205 entered into the lock state, up/down counter 207 was loaded with a constant zero to facilitate sync channel receiver 200 measuring the quality of synchronization. In the present invention, rather than deeming synchronization lost because of "one or two" occasionally missed SYNC fields 110, once sync channel receiver 200 is in the lock state (11), up/down counter 207; low detector 208; greater than/equality comparator 212; and a predetermined constant (SYNCREL 210) are used in combination to determine whether synchronization is so poor as to require requisition by integrating both tracked and missed sync words over time. As described above, once "locked", any one properly tracked sync word decrements up/down counter 207 to saturation and any missed sync word increments up/down counter 207. Thus once the value on the up/down counter 207 equals or exceeds a predetermined constant number (SYNCREL), state machine 205 reverts to acquire (00) state. In line 11 sync channel receiver 200 has already reached the missed sync limit, so the present values of SDET and FRSYN are irrelevant.

In the manner described above, sync channel receiver 200 reliably acquires, tracks and locks synchronization even in systems having a smaller length synchronization word in each master frame 100.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for synchronizing frames in a continuous stream of digital data, said continuous stream of digital data consisting of a plurality of master frames, each of said master frames having M-bits and containing data and a constant synchronization word, said continuous stream of digital data having an associated bit clock, said apparatus comprising:

a FIFO buffer through which said continuous stream of data is shifted at a rate controlled by said associated bit clock, said FIFO buffer holding a portion of said continuous stream at one time;

a synchronization word register containing said constant synchronization word;

a comparator operably connected to said FIFO buffer and said synchronization word register, said comparator generating a sync detect signal representing whether said portion of said continuous stream of data contained in said FIFO matches said constant synchronization word;

a frame bit counter controlled by said associated bit clock and generating a frame sync signal every said M-bits;

a counter having an output value;

a first comparator connected to said counter, said first comparator generating a sync achieved signal upon said counter output value equaling a first predetermined value;

means for incrementing said counter upon coincidence of said sync detect and frame sync signals means for decrementing said counter output value upon non-coincidence of said sync detect and frame sync signals; and a second comparator, generating a sync lost signal upon said counter output being equal to or greater than a second predetermined value.

2. An apparatus for synchronizing frames in a continuous stream of digital data, said continuous stream of digital data consisting of a plurality of master frames, each of said master frames having M-bits and containing data and a constant synchronization word, said continuous stream of digital data having an associated bit clock, said apparatus comprising:

- a FIFO buffer through which said continuous stream of data is shifted at a rate controlled by said associated bit clock, said FIFO buffer holding a portion of said continuous stream at a time;
- a synchronization word register containing an expected constant synchronization word;
- a comparator operably connected to said FIFO buffer and said synchronization word register, said comparator generating a sync detect signal representing whether said portion of said continuous stream of data contained in said FIFO matches said expected constant synchronization word;
- a frame bit counter controlled by said associated bit clock and generating a frame sync signal every said M-bits;
- a counter having an output value, said counter being loadable with various values and capable of incrementing and decrementing said output value;
- a first comparator, said first comparator generating a sync achieved signal upon said counter output value equaling a first predetermined value; and
- a second comparator, said second comparator generating a sync lost signal upon said counter output being equal to or greater than a second predetermined value; and
- means for indicating a synchronization state, said synchronization state representing whether synchronization has been sufficiently achieved based upon said sync detect signal, said frame sync signal, said sync achieved signal and said sync lost signal and controlling said counter and frame bit counter based upon said synchronization state.

* * * * *